Oct. 13, 1942.  E. L. WOOD  2,298,669
WHEEL TRIM SECURING MEANS
Filed Feb. 4, 1942  2 Sheets-Sheet 1
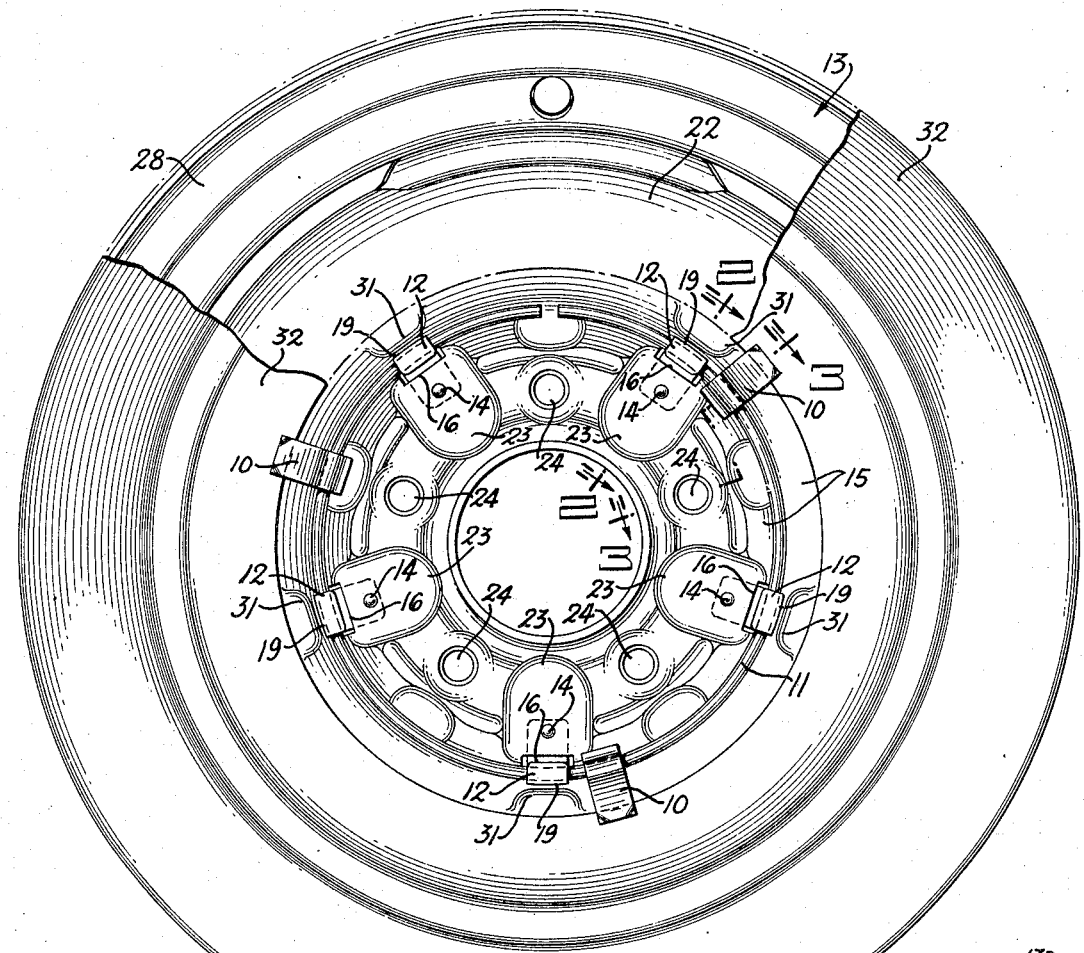
Fig. 1.
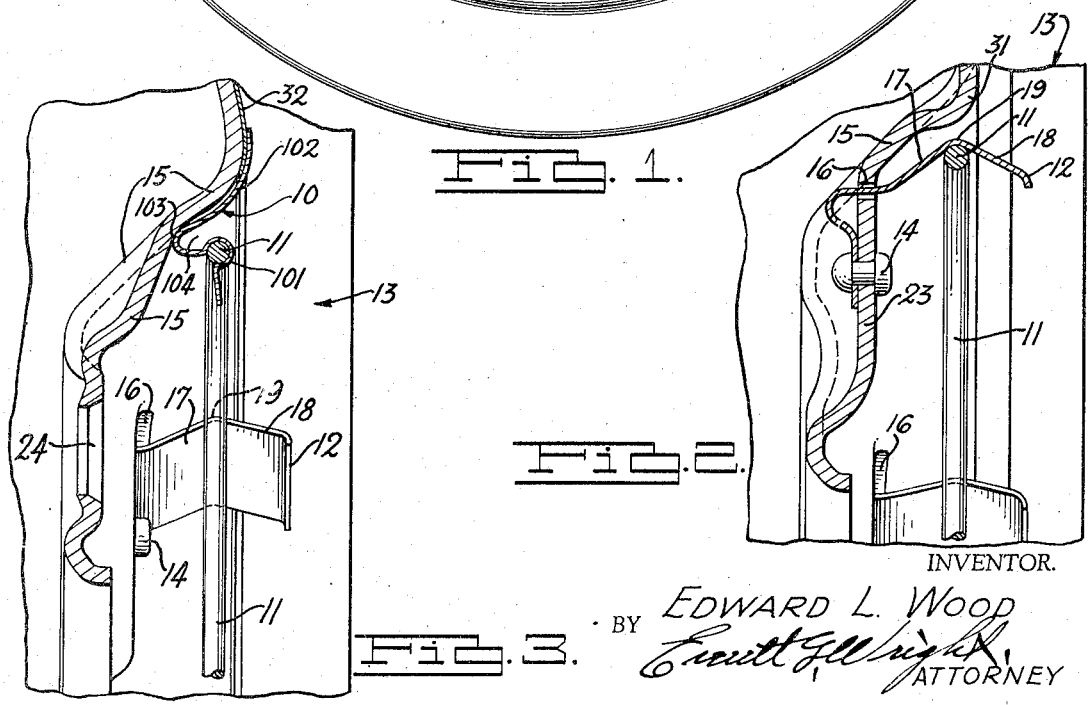
Fig. 2.
Fig. 3.
INVENTOR.
EDWARD L. WOOD
BY
ATTORNEY Oct. 13, 1942.   E. L. WOOD   2,298,669
WHEEL TRIM SECURING MEANS
Filed Feb. 4, 1942   2 Sheets-Sheet 2

INVENTOR.
EDWARD L. WOOD
BY
ATTORNEY

Patented Oct. 13, 1942

2,298,669

UNITED STATES PATENT OFFICE 2,298,669

WHEEL TRIM SECURING MEANS

Edward L. Wood, Detroit, Mich.

Application February 4, 1942, Serial No. 429,482

10 Claims. (Cl. 301—37)

This invention relates to means for securing ornamental wheel trim to vehicle wheels independent of the hub cap.

Because of ill fitting and eccentrically fitting hub caps on motor vehicle wheels much difficulty has been encountered with securing ornamental wheel trim discs to the wheel by means of the hub cap. As engineered by the motor car manufacturer, the hub cap of a vehicle wheel presumably fits the wheel concentrically and is held on the wheel by its inner annular rib which is engaged by a plurality of retainer springs provided on the wheel. In some instances nibs formed in the wheel opposite each retainer spring guide the hub cap as it is being snapped in place over the retainer springs.

Because of the fact that the hub cap is formed of extremely light material and because the retainer springs need be relatively light to admit of ease in the removal of the hub cap from the wheel, both the hub cap and the retainer springs easily become bent out of shape and out of concentricity with respect to the wheel. Also, some of the retainer springs become weakened and bent out of shape by careless use.

When the retainer springs become weakened or deformed out of place, many hub caps are lost and many hub caps become located eccentric with respect to the wheel causing the wheel to become out of dynamic balance.

When ornamental discs or the like are held in place by the hub cap, the retainer springs become less effective and overloaded, and, coupled with the difficulties normally encountered when the retainer springs become weakened and deformed, both the ornamental disc and the hub cap may be lost.

Furthermore, when ornamental discs or the like are held on the wheel of an automobile by the hub cap, the said ornamental discs come off the wheel when the hub is removed for the purpose of removing the vehicle wheel from the brake drum assembly to which the said wheel is usually secured. This is undesirable because it entails the handling of the ornamental discs each time the hub cap is removed from the wheel, and because the ornamental discs become readily subject to theft upon removal of the hub cap.

With the foregoing in view, one object of the invention is to provide means for securing ornamental wheel trim to a vehicle wheel independent of the hub cap.

Another object of the invention is to provide means for securing ornamental wheel trim to a vehicle wheel independent of the hub cap combined with means for reinforcing and equalizing hub cap retainer springs.

A further object of the invention is to provide means for securing ornamental wheel trim to a vehicle wheel independent of the hub cap which simultaneously prevents rotation of the said wheel trim from rotating with respect to said wheel.

Other objects of the invention will become apparent by reference to the following detailed description taken in connection with the accompanying drawings, in which:

Fig. 1 is a side elevational view of a vehicle wheel and an ornamental wheel trim disc showing the invention applied to the hub cap retainer springs of the said vehicle wheel and holding the said ornamental disc in place on the said wheel, a portion of the said ornamental disc being broken away.

Fig. 2 is an enlarged fragmentary sectional view taken on the line 2—2 of Fig. 1.

Fig. 3 is an enlarged fragmentary sectional view taken on the line 3—3 of Fig. 1.

Figure 4:
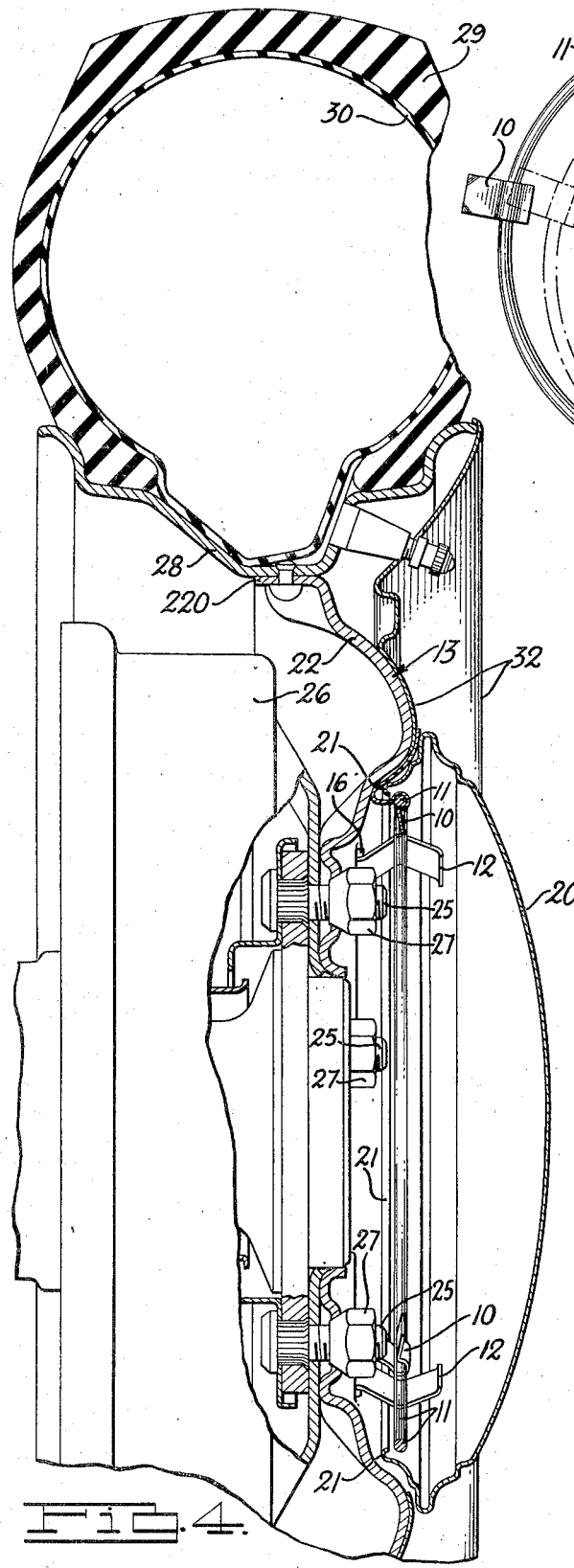
Fig. 4 is a fragmentary cross sectional view of a vehicle wheel, tire, hub cap, and ornamental wheel trim disc showing the invention applied to the hub cap retainer springs and securing the said ornamental disc to the said wheel.
Figure 5:
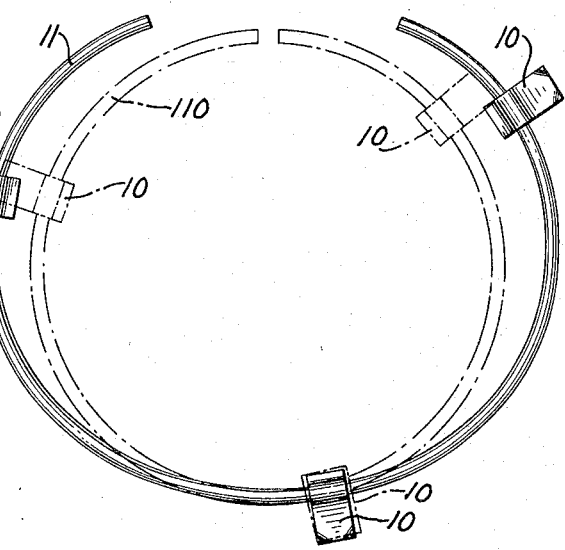
Fig. 5 is a side elevational view of a combined ornamental wheel trim disc securing means and retainer spring reinforcing and equalizing means embodying the invention.
Figure 6:
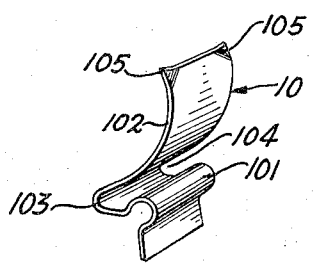
Fig. 6 is an enlarged view in perspective showing a preferred type of clip engageable on retainer spring reinforcing and equalizing means employed to secure ornamental wheel trim to a vehicle wheel.

Referring now to the drawings wherein like numerals refer to like and corresponding parts throughout the several views, the illustrative embodiment of the invention disclosed comprises a plurality of spring metal clips 10 engageable on an equalizing spring 11 preferably formed of round spring wire in a single plane a more or less elliptical shape with the open ends thereof oppositely disposed. The said equalizing spring 11 is formed to such proportions that it may be compressed into a circular form as indicated by the dot and dash lines 110 in Fig. 5 and positioned radially behind the hub cap retainer spring 12 of the vehicle wheel 13 as indicated in Figs. 1, 2, 3 and 4. When positioned behind the hub cap retainer springs 12, the said equalizing spring 11 exerts substantially uniform radially outward pressure on the said hub cap retainer springs 12, As best shown in Figs. 1 and 2, the hub cap retainer springs 12 of the particular wheel construction 13 employed to illustrate the invention are secured by a rivet 14 to the rear of the wheel 13 at intervals around the central dished portion 15 thereof and extend axially outward through suitable rectangular apertures 16. The said hub cap retainer springs 12 are formed axially outward of the wheel 13 to extend first radially and diagonally outward at 17 and then radially and diagonally inward at 18 to provide detents 19 over which the annular rib 21 of the hub cap 20 snaps when urged over the plurality of hub cap retainer springs 12 usually provided on a vehicle wheel 18, see Figs. 1, 2, 3 and 4. The positioning of the equalizing spring 11 behind the detents 19 of the hub cap retainer springs 12 anchors the said equalizing spring 11 against axial movement with respect to the vehicle wheel 13.

The spring metal wheel trim holding clips 10 are preferably formed of thin sheet metal and are looped at 101 to engage and secure themselves tightly to the equalizing spring 11 and are suitably curved at 102 to fit the contour of the central dished portion 15 of the vehicle wheel 13 and engage the inner periphery of an ornamental wheel trim disc 32 disposed over the said wheel 13. The said spring metal clips 10 are so looped at 103 as to provide a re-entrant space 104 to accommodate the annular rib 21 of the hub cap 20 when placed on the wheel 13, thus avoiding any interference with the holding of the hub cap 20 on the vehicle wheel 13 by means of the hub cap retainer springs 12 usually employed. It will be noted that the loop 103 of the spring clip 10 is located at a sufficient distance from the equalizing spring engaging loop 101 as to prevent clockwise rotation of the said metal clips as viewed in Fig. 3 with respect to the equalizing spring 11. The equalizing spring 11 employed to equalize and strengthen the hub cap retainer springs 12 constantly urges the said wheel trim holding clips 10 against the central dished portion 15 of the vehicle wheel 13 with the inner peripheral portion of the wheel trim disc 32 therebetween, the said equalizing spring 11 creating initial compression in the spring metal wheel trim holding clips 10 by causing them to bend from their normal shape as indicated by the dot and dash lines 1000 in Fig. 3 to the full line showing therein.

The wheel 13 shown to illustrate the invention comprises an annular body portion or hub 22 dished at 15 and formed with protuberances 23 to provide spaced flat portions to accommodate the riveting of the hub cap retainer springs 12 to the said wheel 13. Circumferentially spaced between the said protuberances 23 are provided wheel stud apertures 24 which accommodate wheel studs 25 carried by the brake drum assembly 26. Nuts 27 threaded on the said wheel studs 25 secure the said wheel to the brake drum assembly 26, see Fig. 4. The said wheel 13 has a drop center rim 28 riveted to the peripheral flange 220 of the annular body portion 22 thereof. The said drop center rim 28 accommodates the usual tire 29 and tube 30. Nibs 31 are preferably formed on the annular body portion or hub 22 of the wheel 13 opposite each hub cap retainer spring to aid in guiding the hub cap 20 concentrically over the hub cap retainer springs 12. Clearance is usually provided between the hub cap 20 and the nibs 31 which admits of the hub cap 20 becoming eccentric with respect to the wheel 13 when the hub cap retainer springs 12 become bent, distorted and weakened through use or carelessness in putting the hub cap 20 on the wheel 13 and taking it off the said wheel 13. Also, inaccuracies of manufacture sometimes cause the hub cap retainer springs 12 to be out of place or shape sufficiently to create a condition of eccentricity rather than concentricity of the hub cap with respect to the wheel 13.

When the said hub cap retainer springs 12 are weakened, distorted, or otherwise deformed out of shape, oftimes only a fraction of the total number of hub cap retainer springs 12 employed are of any material use in holding the hub cap 20 onto the wheel 13. The hub cap 20 is then either held in place by the retainer springs 12 eccentric with respect to the wheel 13 or the said hub cap 20 is not held in place sufficiently firm to avoid its loss when the automobile wheel is driven over bumps or rough terrain.

The said hub cap retainer springs 12 are equalized sufficiently in both resiliency and concentricity and are uniformly strengthened by employing an equalizing spring 11 disposed radially inside or behind the detent 19 of the said hub cap retainer springs 12 whereby to assure positive holding and substantial concentricity of the hub cap 20 on the vehicle wheel 13.

Any number of spring clips 10 may be employed on the equalizing spring 11 to secure the ornamental wheel trim 32 in place on the wheel independent of the hub cap 20. The loop 101 of each spring clip 10 is preferably formed tangent with respect to the curved equalizing spring 11 to prevent it from sliding along the said equalizing spring 11 whereby to admit of one or more of the said spring clips 10 coming in contact with one of the hub cap retainer springs 12 which serve as stops if and when the equalizing spring and clip assembly embodying the invention creeps circumferentially with respect to the wheel 13 during the operation of a motor vehicle equipped therewith. To assure the prevention of any material creeping above referred to, it is preferable that one of the spring clips 10 be positioned in contact with or closely adjacent to opposite sides of circumferentially adjacent hub cap retainer springs 12.

The corners 105 of the spring clips 10 are preferably turned diagonally downward to engage the inner peripheral portion of the ornamental wheel trim disc 32 and prevent it from creeping with respect to the wheel 13 during operation of the motor vehicle.

Obviously, means for securing ornamental wheel trim to vehicle wheels independent of the hub cap embodying the invention may be applied readily to many other types of automobile wheels than the specific type shown for the purpose of illustrating the invention.

The invention provides means for securing ornamental wheel trim rings to standard vehicle wheels independent of the hub cap as a securing means and without the use of tools or welding whereby to admit of persons unskilled in the use of tools or without tools to secure ornamental wheel trim to a vehicle wheel without employing the hub cap as a securing means.

Although but one embodiment of the invention has been disclosed in the drawings and described herein, it is obvious that many changes may be made in the size, shape, arrangement and detail of the various elements of the invention without departing from the scope thereof as defined by the appended claims.

I claim:

1. Means for securing annular ornamental wheel trim discs to vehicle wheels employing a multiplicity of circumferentially spaced radially resilient detent type hub cap retainer springs to engage the hub cap of said wheel and removably hold it thereon comprising a radially resilient substantially annular equalizing spring axially anchored with respect to said wheel when disposed radially inward of said hub cap retainer springs and expanded radially outward thereagainst, and a plurality of circumferentially spaced wheel trim holding clips anchored on said equalizing spring formed to engage the inner periphery of the said annular ornamental wheel trim disc and secure the same to said vehicle wheel.

2. Means for securing annular ornamental wheel trim discs to vehicle wheels employing a multiplicity of circumferentially spaced radially resilient detent type hub cap retainer springs to engage the hub cap of said wheel and removably hold it thereon comprising a radially resilient substantially annular equalizing spring axially anchored with respect to said wheel when disposed radially inward of said hub cap retainer springs and expanded radially outward thereagainst, and a plurality of circumferentially spaced resilient metal wheel trim holding clips anchored on said equalizing spring formed to engage the inner periphery of the said annular ornamental wheel trim disc and removably secure the said wheel trim disc to said wheel.

3. Means for securing annular ornamental wheel trim discs to vehicle wheels employing a multiplicity of circumferentially spaced radially resilient hub cap retainer springs bent radially outward and inward forming detents to engage the hub cap of said wheel and removably hold it thereon comprising a radially resilient substantially annular equalizing spring axially anchored with respect to said wheel when disposed radially inward of the detents of the said hub cap retainer springs and expanded radially outward thereagainst, and a plurality of circumferentially spaced wheel trim holding clips anchored on said equalizing spring formed to engage the inner periphery of the said annular ornamental wheel trim disc and secure the same to said vehicle wheel.

4. Means for securing annular ornamental wheel trim discs to vehicle wheels employing a multiplicity of circumferentially spaced radially resilient hub cap retainer springs bent radially outward and inward forming detents to engage the hub cap of said wheel and removably hold it thereon comprising a radially resilient substantially annular equalizing spring axially anchored with respect to said wheel when disposed radially inward of the detents of the said hub cap retainer springs and expanded radially outward thereagainst, and a plurality of circumferentially spaced resilient metal wheel trim holding clips anchored on said equalizing spring formed to engage the inner periphery of the said annular ornamental wheel trim disc and removably secure the said wheel trim disc to said wheel.

5. Means for securing annular ornamental wheel trim discs to vehicle wheels employing a multiplicity of circumferentially spaced radially resilient detent type hub cap retainer springs to engage the hub cap of said wheel and removably hold it thereon comprising a radially resilient substantially annular equalizing spring axially anchored with respect to said wheel when disposed radially inward of said hub cap retainer springs and expanded radially outward thereagainst, and a plurality of circumferentially spaced wheel trim holding clips anchored on said equalizing spring formed to fit the contour of the vehicle wheel and engage the inner periphery of the said annular ornamental wheel trim disc, the said wheel trim holding clips being so looped as to engage the wheel structure whereby to prevent rotation of said clips with respect to the said equalizing spring after the said clips engage said ornamental wheel trim disc.

6. Means for securing annular ornamental wheel trim discs to vehicle wheels employing a multiplicity of circumferentially spaced radially resilient detent type hub cap retainer springs to engage the hub cap of said wheel and removably hold it thereon comprising a radially resilient substantially annular equalizing spring axially anchored with respect to said wheel when disposed radially inward of said hub cap retainer springs and expanded radially outward thereagainst, and a plurality of circumferentially spaced resilient metal wheel trim holding clips anchored on said equalizing spring formed to engage the inner periphery of the said annular ornamental wheel trim disc and removably secure the said wheel trim disc to said wheel, the said resilient wheel trim holding clips being so looped as to engage the wheel structure whereby to prevent rotation of said clips with respect to the said equalizing spring after the said clips engage said ornamental wheel trim disc.

7. Means for securing annular ornamental wheel trim discs to vehicle wheels employing a multiplicity of circumferentially spaced radially resilient hub cap retainer springs bent radially outward and inward forming detents to engage the hub cap of said wheel and removably hold it thereon comprising a radially resilient substantially annular equalizing spring axially anchored with respect to said wheel when disposed radially inward of the detents of the said hub cap retainer springs and expanded radially outward thereagainst, and a plurality of circumferentially spaced wheel trim holding clips anchored on said equalizing spring formed to fit the contour of the vehicle wheel and engage the inner periphery of the said annular ornamental wheel trim disc, the said wheel trim holding clips being so looped as to engage the wheel structure whereby to prevent rotation of said clips with respect to the said equalizing spring after the said clips engage said ornamental wheel trim disc.

8. Means for securing annular ornamental wheel trim discs to vehicle wheels employing a multiplicity of circumferentially spaced radially resilient hub cap retainer springs bent radially outward and inward forming detents to engage the hub cap of said wheel and removably hold it thereon comprising a radially resilient substantially annular equalizing spring axially anchored with respect to said wheel when disposed radially inward of the detents of the said hub cap retainer springs and expanded radially outward thereagainst, and a plurality of circumferentially spaced resilient metal wheel trim holding clips anchored on said equalizing spring formed to engage the inner periphery of the said annular ornamental wheel trim disc and removably secure the said wheel trim disc to said wheel, the said resilient wheel trim holding clips being so looped as to engage the wheel structure whereby to prevent rotation of said clips with respect to the said equalizing spring after the said clips engage said ornamental wheel trim disc.

9. Means for securing annular ornamental wheel trim discs to vehicle wheels employing a multiplicity of circumferentially spaced radially resilient hub cap retainer springs bent radially outward and inward forming detents to engage the hub cap of said wheel and removably hold it thereon comprising a radially resilient substantially annnular equalizing spring axially and circumferentially anchored with respect to said wheel when disposed radially inward of the detents of the said hub cap retainer springs and expanded radially outward thereagainst, and a plurality of circumferentially spaced wheel trim holding clips anchored on said equalizing spring formed to overlap the inner periphery of the said annular ornamental wheel trim disc and secure the same to said vehicle wheel, the corners of said wheel trim holding clips overlapping the wheel trim being bent diagonally against said wheel trim whereby to engage the said wheel trim and prevent circumferential creeping of the said wheel trim with respect to the vehicle wheel.

10. Means for securing annular ornamental wheel trim discs to vehicle wheels employing a multiplicity of circumferentially spaced radially resilient hub cap retainer springs bent radially outward and inward forming detents to engage the hub cap of said wheel and removably hold it thereon comprising a radially resilient substantially annular equalizing spring axially and circumferentially anchored with respect to said wheel when disposed radially inward of the detents of the said hub cap retainer springs and expanded radially outward thereagainst, and a plurality of circumferentially spaced resilient metal wheel trim holding clips anchored on said equalizing spring formed to overlap the inner periphery of the said annular ornamental wheel trim disc and removably secure the said wheel trim disc to said wheel, the corners of said wheel trim holding clips overlapping the wheel trim being bent diagonally against said wheel trim whereby to engage the said wheel trim and prevent circumferential creeping of the said wheel trim with respect to the vehicle wheel.

EDWARD L. WOOD.

CERTIFICATE OF CORRECTION.

Patent No. 2,298,669.                                                October 13, 1942.

EDWARD L. WOOD.

It is hereby certified that error appears in the printed specification of the above numbered patent requiring correction as follows: Page 1, first column, line 41, after the word "hub" insert --cap--; and that the said Letters Patent should be read with this correction therein that the same may conform to the record of the case in the Patent Office.

Signed and sealed this 22nd day of December, A. D. 1942.

Henry Van Arsdale,
Acting Commissioner of Patents.

(Seal)